W. D. FARRELL.
HOG GRAPPLE.
APPLICATION FILED AUG. 10, 1909.
966,676.
Patented Aug. 9, 1910.
2 SHEETS—SHEET 2.
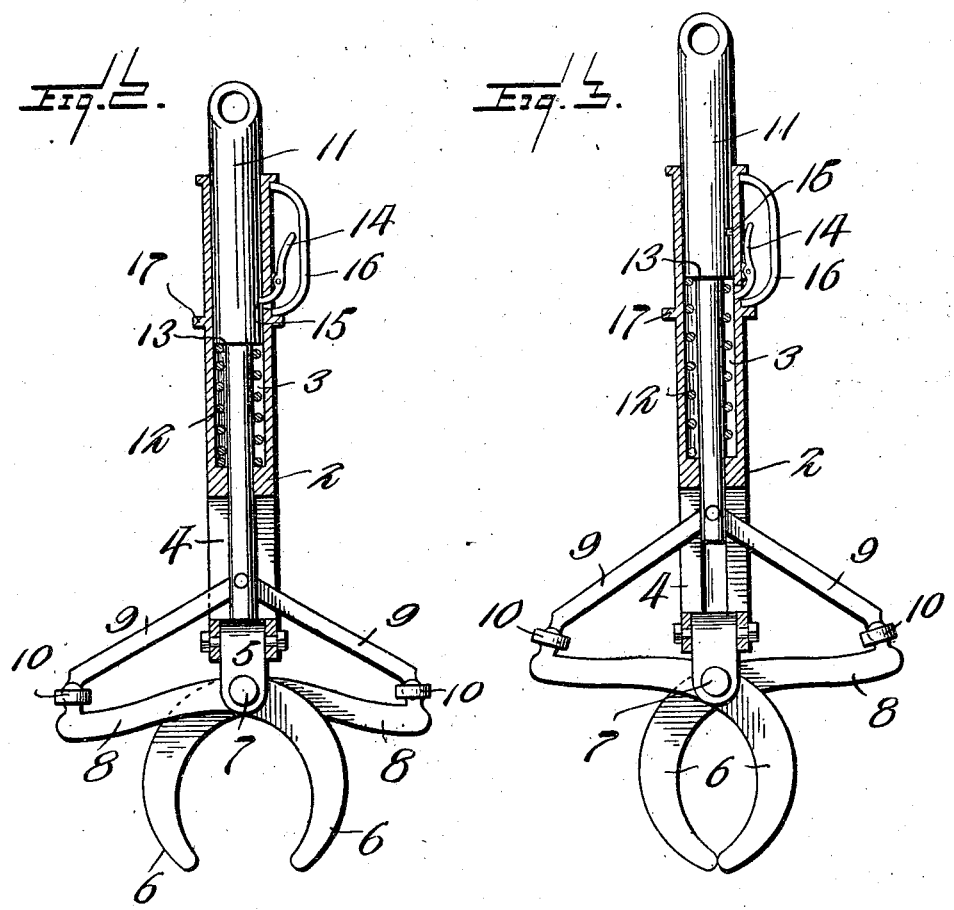
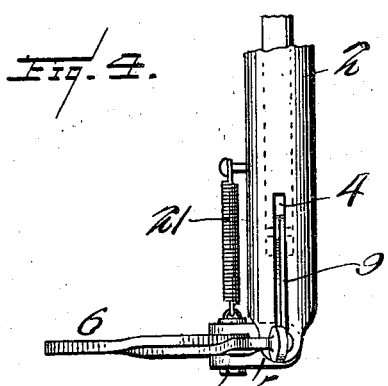
Inventor
Warren D. Farrell.
By Victor J. Evans
Attorney
Witnesses

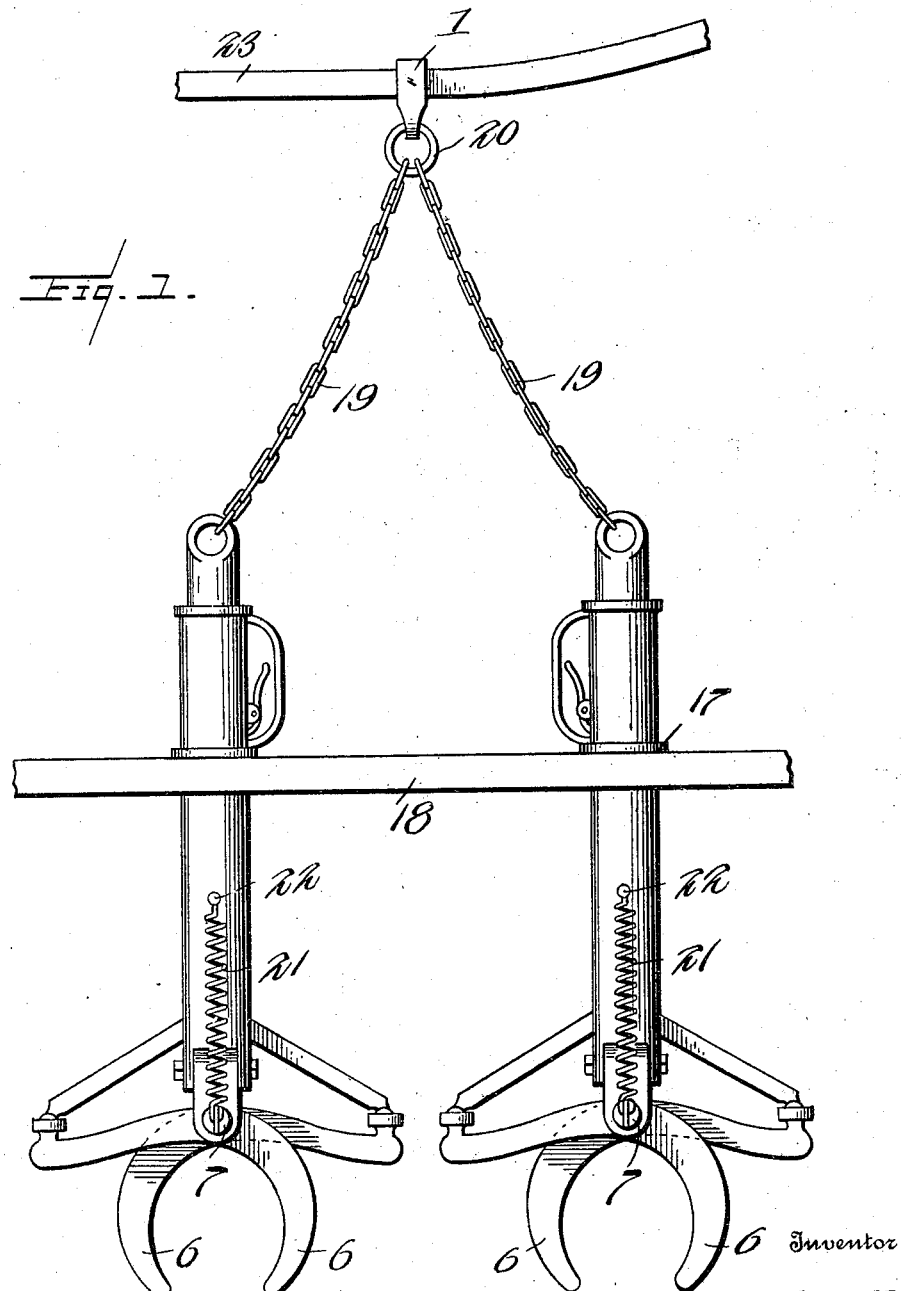

UNITED STATES PATENT OFFICE.

WARREN D. FARRELL, OF OTTUMWA, IOWA.

HOG-GRAPPLE.

966,676.  Specification of Letters Patent.  Patented Aug. 9, 1910.

Application filed August 10, 1909. Serial No. 512,212.

*To all whom it may concern:*

Be it known that I, WARREN D. FARRELL, a citizen of the United States, residing at Ottumwa, in the county of Wapello and State of Iowa, have invented new and useful Improvements in Hog-Grapples, of which the following is a specification.

The present invention has for its object to provide an improved grapple for suspending hogs or other animals during the process of slaughtering and dressing.

The grapple for suspending cattle during the process of slaughtering not unfrequently results in breaking the leg when the animal is suspended, thereby causing the meat to deteriorate during the curing process.

The purpose of the present invention is to provide a grapple which will lift the animal and suspend the same without endangering fracture of the leg, by means of which the animal is suspended, thereby obviating the loss commonly experienced as a result of the meat spoiling because of fracture of the leg and bruising of the meat.

The invention consists of the novel features, details of construction and combination of parts, which hereinafter will be more particularly set forth, illustrated in the accompanying drawings, and pointed out in the appended claims.

Referring to the drawings forming a part of the specification, Figure 1 is a view in elevation of a pair of grapples, embodying the invention. Fig. 2 is a vertical central section of the tubular handle, showing the relation of the parts when the jaws are open. Fig. 3 is a view similar to Fig. 2, showing the relation of the parts when the jaws are closed. Fig. 4 is a side view of the lower portion of a grapple, showing the jaws occupying a position at a right angle to the handle.

Corresponding and like parts are referred to in the following description, and indicated in all the views of the drawings, by the same reference characters.

In accordance with this invention, two grapples are connected to a single carrier 1, so as to engage with both hind legs of the animal to be suspended for slaughter. Each grapple is of like formation, hence a detailed description of one will suffice for a clear understanding of both. The grapple comprises a handle 2 having its upper portion formed with an opening 3 and having oppositely-disposed longitudinal slots 4 in its lower portion. A coupling head 5 is pivotally connected to the lower end of the handle 2, and has the jaws 6 pivoted thereto. A pin or fastening 7 pivotally connects the jaws 6 to the outer or lower end of the coupling head 5.

The shanks 8 of the jaws 6 are connected to links 9 by means of universal joints 10 to admit of the jaws 6 opening and closing swinging toward and from the horizontal. An operating stem 11, mounted in the handle 2, has the links 9 pivotally connected to its lower end. The lower portion of the operating stem is reduced, and a helical spring 12 surrounds the same and is located in the opening 3 of the handle 2, and is confined through the bottom of the opening 3, and a shoulder 13 formed at the base of the reduced stem. The spring 12 is of the expansible type and normally exerts a force to hold the jaws 6 closed. When the jaws are open, the operating stem 11 is pressed into the opening of the handle 2 and compresses the spring 12, as indicated in Fig. 2. A catch 14, pivoted to a side of the handle, is adapted to enter a notch 15 on a side of the operating stem 11, and hold the latter when pressed into the opening of the handle 2, as indicated in Fig. 2. A guard 16 extends over the catch 14 and protects the same. An angular shoulder 17 is provided upon the handle 2 near its upper end, and is intended to engage bars 18 and rest thereon, thereby permitting automatic release of the animal when dressed.

A pair of grapples are provided and are connected by chains 19 or like flexible connections with a ring 20 of the carrier or hanger 1. By providing a pair of grapples, both hind legs of the animal to be slaughtered and dressed are engaged and the animal suspended thereby. This minimizes the danger of fracturing the legs when lifting the animal by its feet. The coupling head 5 normally stands in line with the handle 2 and is maintained in such position by means of a spring 21 of the retractable type, said spring being connected at one end to a pin 22 of the handle and, at its opposite end, to the pivot pin 7. By having the grapples normally standing in line with the handles, they are adapted to be readily engaged with the hind legs of the animal, after which the operating stems 11 are released by pressure upon the catches 14, thereby admitting of the spring 12 moving the operating stem so as to close the jaws about the legs of the animal. As the carrier 1 rides upon the track 23, in a well-known manner, the animal is lifted and, as the weight comes upon the jaws, the latter are tightened about its legs. After the animal has been slaughtered and dressed, and the grapples finally reach the bar 18 and the shoulders or stops 17 rest upon said bar 18, the weight of the animal coming upon the handle moves the same with reference to the operating stem so as to effect automatic opening of the jaws and release of the dressed meat, as will be readily understood.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new is:—

1. A grapple for suspending hogs, the same consisting of coöperating jaws pivoted to open and close in a given plane, a handle, connecting means between the handle and jaws to admit of the latter swinging freely in a direction at a right angle to the plane of movement of the said jaws, jaw operating means mounted upon the handle, and connecting means between the jaws and said jaw operating means for opening and closing the jaws at any angular position thereof, substantially as specified.

2. In a grapple of the character described the combination of a handle, a coupling head pivotally connected with the handle to swing outwardly at an angle thereto, jaws mounted upon said coupling head, and operating means for opening and closing the jaws mounted upon said handle.

3. In a grapple, the combination of coöperating jaws, a handle, a coupling head pivotally connected at one end to the handle and having said jaws mounted upon its opposite end, a spring between the coupling head and handle to normally hold the coupling head and jaws about at a right angle to said handle, and operating means for the jaws mounted upon the handle.

4. In combination, a handle, jaws mounted upon the handle and adapted to be turned outward therefrom, and operating means for the jaws comprising links having connections with the shanks of the jaws by a universal joint.

5. In combination, a handle, an operating stem mounted in the handle, jaws mounted in the handle and adapted to be swung outward therefrom, and links between said jaws and operating stem and having a universal joint connection with said jaws.

6. In combination, a handle provided with a stop, jaws mounted upon the handle, an operating stem arranged to move within said handle, a spring inclosed within the handle and normally serving to press the operating stem upward, and links connecting the operating stem with the jaws.

7. The herein described grapple comprising a handle, coöperating jaws, a coupling head pivotally connecting the jaws to the handle and admitting of said jaws swinging outward, a spring between the coupling head and handle to normally hold the jaws when swung laterally outward, an operating stem, links connecting the operating stem with the jaws and having a universal joint connection with the jaws, a spring normally exerting a pressure upon the operating stem to hold the jaws closed, a catch mounted upon the handle and adapted to engage the operating stem to hold the jaws open, and a guard for protecting said catch.

In testimony whereof I affix my signature in presence of two witnesses.

WARREN D. FARRELL.

Witnesses:
J. N. LEWIS,
FLOYD E. FARRELL.